United States Patent [19]
Cymbal

[11] Patent Number: 5,692,778
[45] Date of Patent: Dec. 2, 1997

[54] MOTOR VEHICLE STEERING COLUMN

[75] Inventor: William David Cymbal, Freeland, Mich.

[73] Assignee: General Motors Corporation, Detroit, Mich.

[21] Appl. No.: 747,807

[22] Filed: Nov. 14, 1996

[51] Int. Cl.⁶ .................................................. B62D 1/18
[52] U.S. Cl. .............................................. 280/777; 74/492
[58] Field of Search .................................. 280/777, 780; 74/492, 493; 188/371, 372, 374

[56] References Cited

U.S. PATENT DOCUMENTS

| | | | |
|---|---|---|---|
| 3,195,685 | 7/1965 | Blackstone | 188/372 |
| 3,792,626 | 2/1974 | Durkee et al. | 74/492 |
| 3,827,710 | 8/1974 | Connell et al. | 280/87 R |
| 4,630,716 | 12/1986 | Faust | 280/777 |
| 4,915,412 | 4/1990 | Yuzuriha et al. | 280/775 |
| 5,375,881 | 12/1994 | Lewis | 280/777 |
| 5,503,431 | 4/1996 | Yamamoto | 280/777 |
| 5,517,877 | 5/1996 | Hancock | 188/371 |

*Primary Examiner*—Christopher P. Ellis
*Attorney, Agent, or Firm*—Saul Schwartz

[57] ABSTRACT

An energy-absorbing motor vehicle steering column including a structural housing, a releasable attachment between a body of the motor vehicle and a forward end of the structural housing, and a releasable attachment between an aft end of the structural housing and the vehicle body which restrains the aft end vertically and in the direction of a longitudinal centerline of the structural housing. The aft attachment includes a lateral rod on the vehicle body, a retainer on the structural housing which hooks over the lateral rod, a pair of blocks on the structural housing slidable in the direction of the longitudinal centerline of the latter, each having a ramp facing the lateral rod, and a pair of springs biasing the blocks toward the aft end of the structural housing. The springs wedge the ramps on the blocks under the lateral rod. Vector components of the force reactions between the blocks and the lateral rod perpendicular to and in the direction of the longitudinal centerline of the structural housing eliminate lash between the aft end of the structural housing and the vehicle body in the same directions.

2 Claims, 4 Drawing Sheets

MOTOR VEHICLE STEERING COLUMN

TECHNICAL FIELD

This invention relates to steering columns for motor vehicles.

BACKGROUND OF THE INVENTION

U.S. patent application Ser. No. 08/544,237, filed Oct. 17, 1995 and assigned to the assignee of this invention, describes an energy-absorbing motor vehicle steering column including a structural housing, releasable attachments between a body of the vehicle and the structural housing at forward and aft ends of the latter, and an energy absorber which converts into work a fraction of the kinetic energy of an impact on the steering column by providing a controlled resistance to linear translation of the structural housing throughout a collapse stroke thereof. The attachment at the forward end of the structural housing restrains the structural housing vertically and in the direction of a longitudinal centerline thereof. The attachment at the aft end of the structural housing, i.e., the end nearest a manual steering wheel on the steering column, restrains the aft end vertically through a pair of vertical hangers on the vehicle body, a lateral rod on the structural housing which rests on platforms on the ends of the vertical hangers, and a spring which eliminates vertical lash by biasing the lateral rod against the platforms on the hangers. The attachment at the aft end of the structural housing, however, lacks restraint in the direction of the longitudinal centerline of the structural housing.

SUMMARY OF THE INVENTION

This invention is a new and improved energy-absorbing motor vehicle steering column including a structural housing, a releasable attachment between a body of the motor vehicle and a forward end of the structural housing, and a releasable attachment, i.e., the "aft attachment", between an aft end of the structural housing and the vehicle body which restrains the aft end of the structural housing vertically and in the direction of a longitudinal centerline of the structural housing. The aft attachment includes a lateral rod on the body of the motor vehicle, a retainer plate on the structural housing which hooks over the lateral rod, a pair of blocks on the structural housing slidable in the direction of the longitudinal centerline of the latter, each having a ramp facing the lateral rod, and a pair of springs biasing the blocks toward the aft end of the structural housing. The springs wedge the ramps on the blocks under the lateral rod so that the latter is captured vertically between the blocks and the retainer plate to eliminate vertical lash. Vector components of the force reactions between the blocks and the lateral rod in the direction of the longitudinal centerline of the structural housing tension the structural housing between the forward and aft attachments thereof to the body of the motor vehicle to eliminate lash in the direction of the longitudinal centerline of the structural housing.

DESCRIPTION OF THE PREFERRED EMBODIMENT

Figure 1:
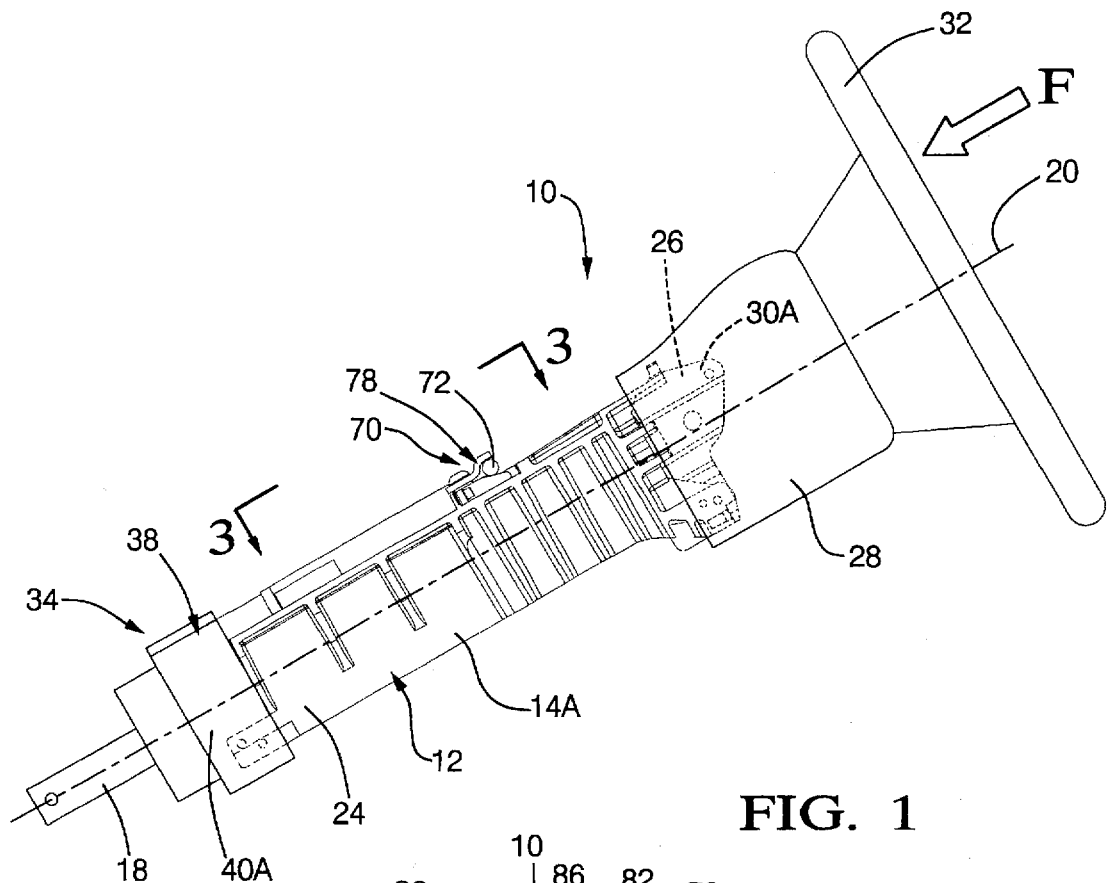
FIG. 1 is an elevational view of a motor vehicle steering column according to this invention.
Figure 4:
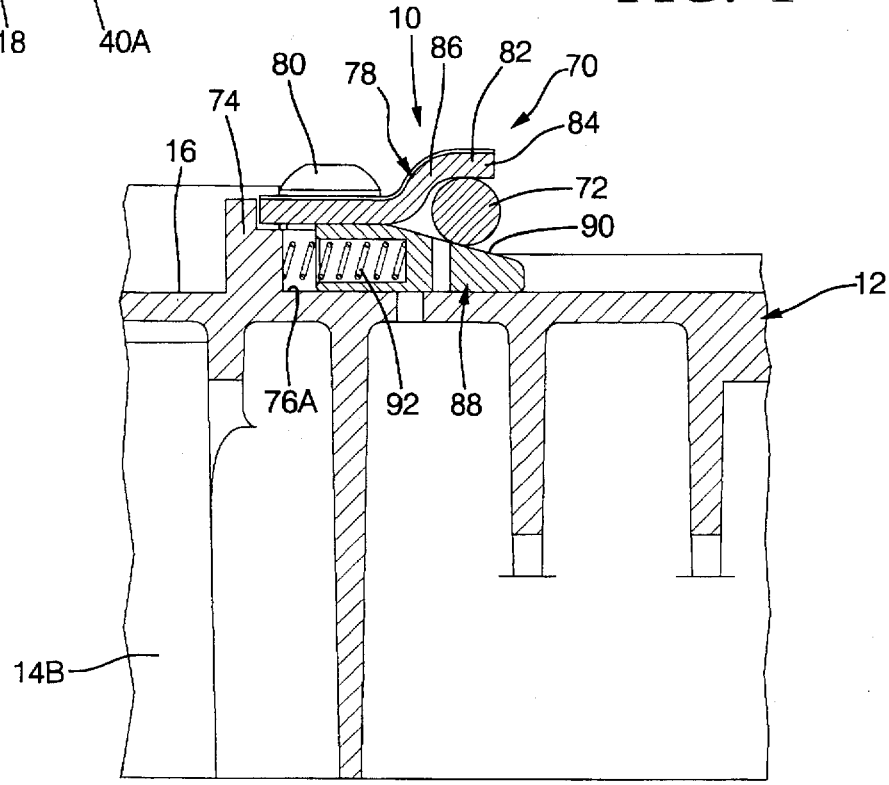
FIG. 4 is a sectional view taken generally along the plane indicated by lines 4—4 in FIG. 3.
Figure 2:
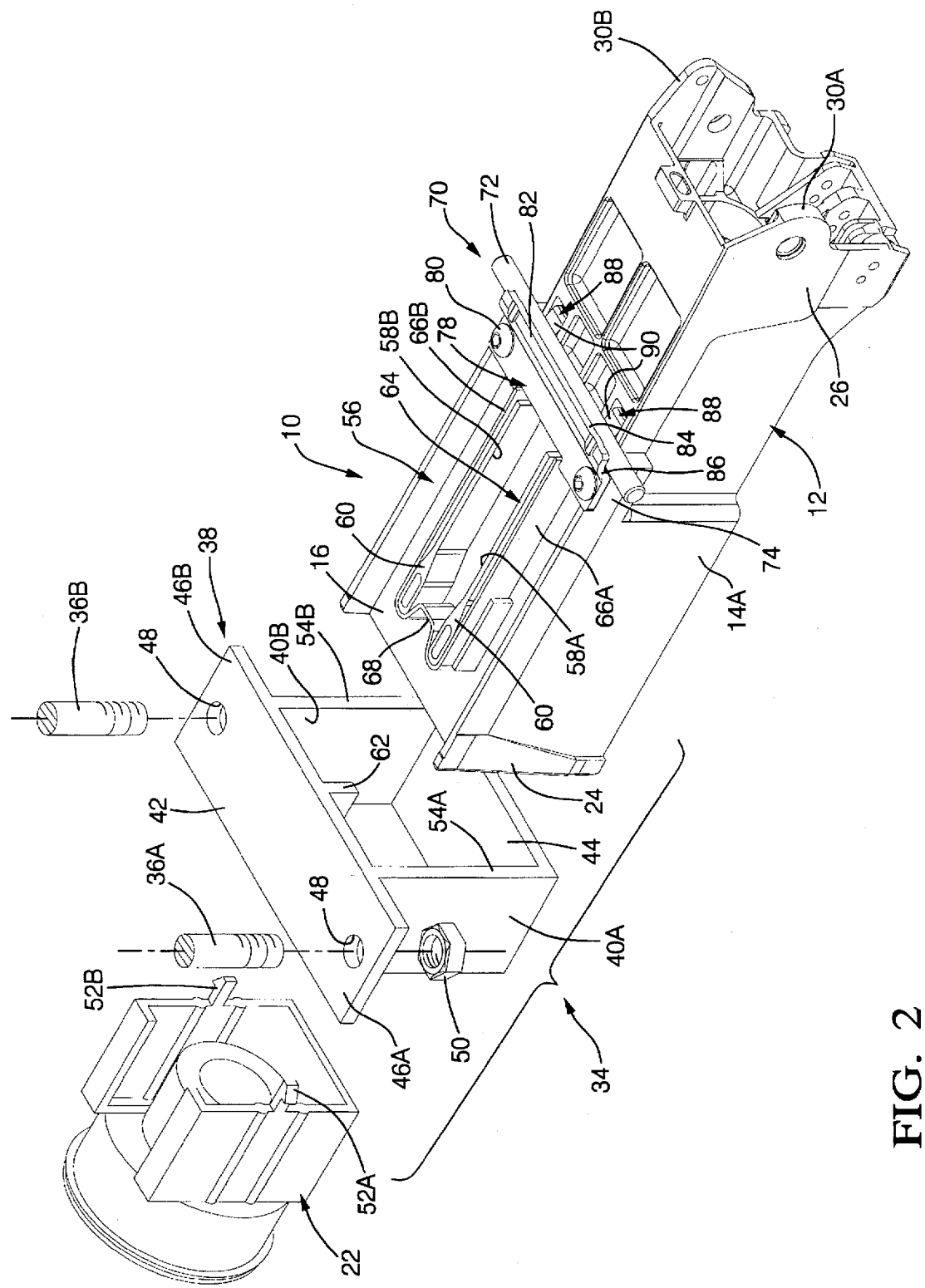
FIG. 2 is an exploded perspective view of the motor vehicle steering column according to this invention.
Figure 3:
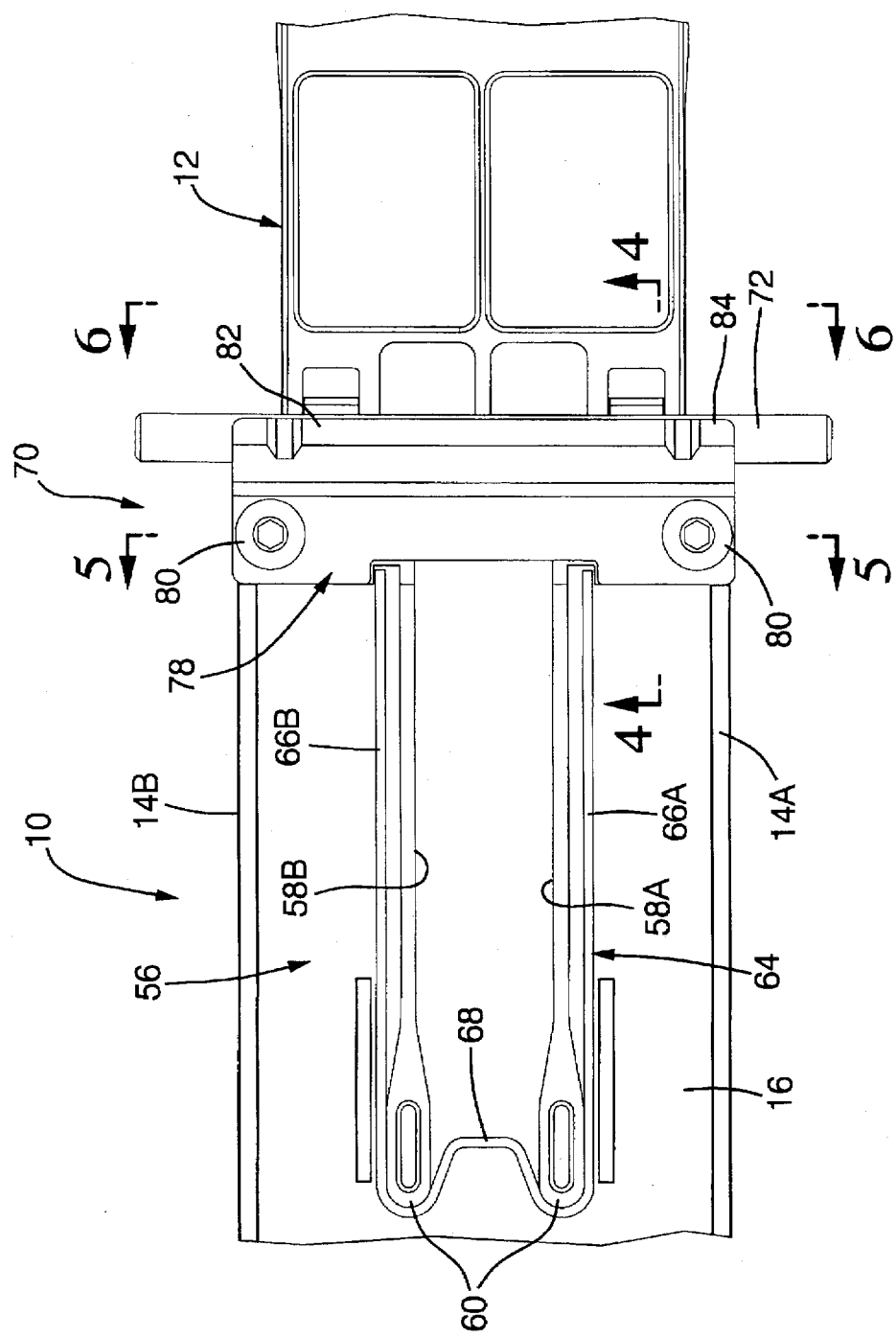
FIG. 3 is a partially broken-away view taken generally along the plane indicated by lines 3—3 in FIG. 1.
Figure 5:
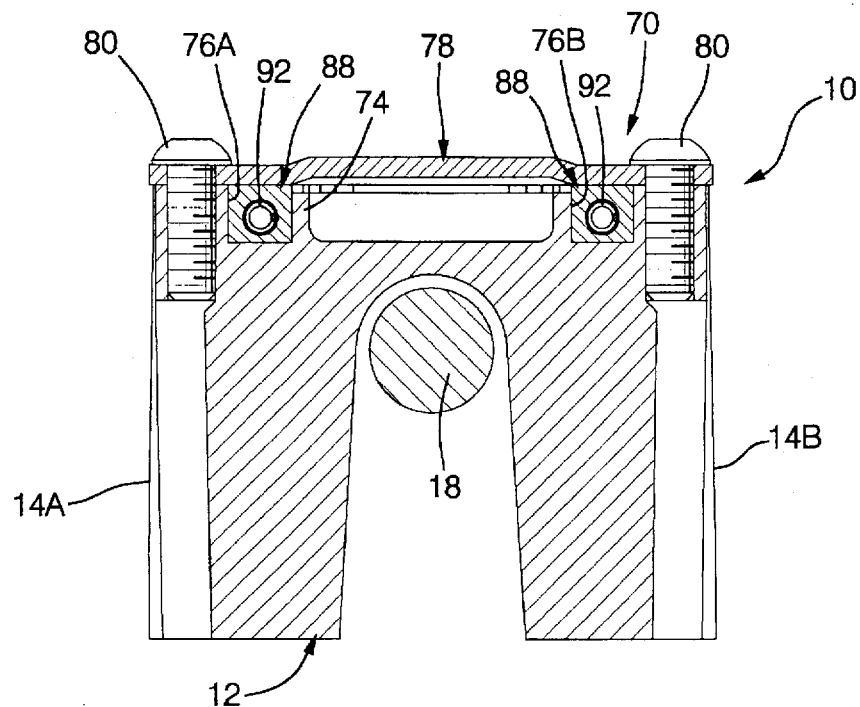
FIG. 5 is a sectional view taken generally along the plane indicated by lines 5—5 in FIG. 3.
Figure 6:
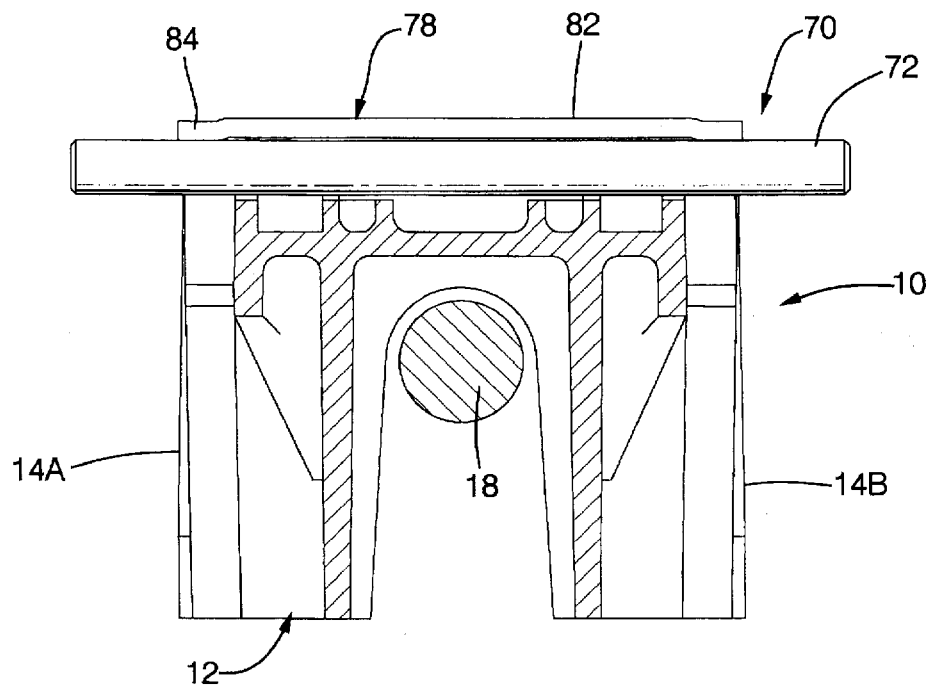
FIG. 6 is a sectional view taken generally along the plane indicated by lines 6—6 in FIG. 3.

Referring to FIGS. 1-3, an energy-absorbing motor vehicle steering column 10 according to this invention includes a unitary structural housing 12 having a pair of vertical walls 14A, 14B and a horizontal wall 16. A steering shaft 18 of the steering column is supported on the structural housing 12 for rotation about a longitudinal centerline 20 of the structural housing by a bearing, not shown, on a plastic bearing support 22 at a forward end 24 of the structural housing and by another bearing, not shown, at an enlarged and reinforced aft end 26 of the structural housing.

A tilt housing, not shown, of the steering column 10 concealed behind a shroud 28 is supported on a pair of lugs 30A, 30B at the aft end 26 of the structural housing 12 for up and down pivotal movement. A steering wheel 32 is rotatably supported on the tilt housing behind the shroud 28 and connected to the steering shaft 18 for rotation therewith by universal joint, not shown.

A forward attachment 34 between the forward end 24 for the structural housing 12 and a body, not shown, of the motor vehicle includes a pair of vertical hangers 36A, 36B on the body and a box-shaped bracket 38. The bracket 38 has a pair of vertical sides 40A, 40B outboard of the plastic bearing support 22, an upper horizontal side 42 above the structural housing 12, a lower horizontal side 44 below the structural housing 12, and a pair of lateral flanges 46A, 46B in the plane of the upper horizontal side. Each lateral flange 46A, 46B has a perforation 48 to receive a respective one of the vertical hangers 36A, 36B and is clamped to the vehicle body by a fastener 50 on the end of the corresponding vertical hanger.

A pair of hooks 52A, 52B on the plastic bearing support 22 seat against respective ones of a pair of edges 54A, 54B of the vertical sides 40A, 40B of the bracket 38 to restrain the structural housing 12 relative to the box-shaped bracket 38 in the direction of the longitudinal centerline 20 of the structural housing. Perpendicular to the longitudinal centerline 20, the forward end 24 of the structural housing 12 is restrained by the upper and lower horizontal sides 42, 44 and the vertical sides 40A, 40B of the box-shaped bracket 38.

An energy absorber 56 of the steering column 10 includes a pair of partition walls 58A, 58B integral with the structural housing 12 parallel to the vertical walls 14A, 14B, each having an integral boss 60 at an end thereof and an abutment 62 on the upper horizontal side 42 of the box-shaped bracket 38 parallel to and between the partition walls. A flat metal ribbon 64 is bent between its opposite ends to include a pair of straight sections 66A, 66B and a lateral web 68. The ribbon is seated edge-wise on the horizontal wall 16 of the structural housing 12 with the straight sections 66A, 66B between the partition walls 58A, 58B and the vertical walls 14A, 14B, respectively, and with the lateral web 68 looped over and extending laterally between the bosses 60 at the ends of the partition walls. A more detailed description of the energy absorber 56 appears in the aforesaid U.S. Ser. No. 08/544,237, which description is incorporated herein by reference.

As seen best in FIGS. 2-6, an aft attachment 70 between the vehicle body and the aft end 26 of the structural housing 12 includes a lateral rod 72 rigidly attached to the vehicle body, a lateral boss 74 on the structural housing 12 perpendicular to the horizontal wall 16 thereof, and a pair of channels 76A, 76B in the lateral boss parallel to and on opposite sides of the longitudinal centerline 20 of the structural housing. A retainer plate 78 of the aft attachment 70 is rigidly connected to the lateral boss 74 over the channels 76A, 76B therein by a pair of fasteners 80 and has a lip 82 hooked over the lateral rod 72 so that the structural housing is vertically suspended from the lateral rod. The retainer plate 78 is separated from the perforations 48 in the lateral flanges 46A, 46B of the box-shaped bracket 38 in the direction of the longitudinal centerline 20 of the structural housing 12 by a dimension calculated to locate the lateral rod 72 about midway between an edge 84 of the lip 82 and a shoulder 86 of the retainer plate when the vertical hangers 36A, 36B are in the perforations 48.

A block 88 is slidably mounted in each of the channels 76A, 76B with a ramp 90 on each block facing the lateral rod 72. A spring 92 in each channel 76A, 76B seats at one end against the lateral boss 74 on the structural housing 12 and at the other end against the corresponding one of the blocks 88. The springs 92 bias the blocks 88 away from the forward attachment 34, i.e., toward the aft end 26 of the structural housing, and wedge corresponding ones of the ramps 90 under the lateral rod 72.

The ramps 90 engage the lateral rod 72 tangent to the curved surface of the rod and exert on the lateral rod net force reactions perpendicular to the ramps 90. Such net force reactions have vector components perpendicular to the lip 82 on the retainer plate which effect tight capture of the lateral rod between the lip 82 and the blocks 88 to eliminate lash between the vehicle body and the aft end 26 of the structural housing 12 generally vertically. Similarly, the aforesaid net force reactions have vector components in the direction of the longitudinal centerline 20 of the structural housing which compress the structural housing between the lateral rod 72 and the vertical hangers 36A, 36B to eliminate lash between the vehicle body and the aft end 26 of the structural housing 12 in the direction of the longitudinal centerline 20.

An impact on the steering wheel 32 represented by a resultant vector force "F" dislodges the hooks 52A, 52B from the edges 54A, 54B of the vertical sides of the box-shaped bracket 38 so that the forward end 24 of the structural housing 12 and the bearing support 22 are released from the bracket 38 and the vehicle body. Concurrently, the lateral rod 72 dislodges from between the lip 82 of the retainer plate 78 and the ramps 90 on the blocks 88 to release the aft end 26 of the structural housing from the vehicle body. Thereafter, the structural housing 12 translates linearly through a collapse stroke during which the abutment 62 anchors the center of the lateral web 68 of the flat ribbon 64 while the straight sections 66A, 66B of the latter are pulled over anvils defined by the bosses 60 on the partition walls 58A, 58B. As the straight sections 66A, 66B are pulled over the bosses 60, each is folded back on itself almost 180° and plastically deformed to produce a controlled resistance to linear translation of the structural housing 12 throughout its linear stroke.

I claim:

1. An energy-absorbing motor vehicle steering column including a structural housing having a longitudinal centerline and a forward end and an aft end, a forward attachment means operative to normally restrain said forward end of said structural housing relative to said vehicle body in the direction of and perpendicular to said longitudinal centerline of said structural housing and to release said forward end of said structural housing for linear translation in the direction of said longitudinal centerline thereof in response to an impact thereon, an energy absorber operative to convert into work a fraction of kinetic energy of said impact on said structural housing during linear translation thereof, and an aft attachment means operative to normally restrain said aft end of said structural housing relative to said vehicle body and to release said forward end of said structural housing for linear translation in the direction of said longitudinal centerline thereof in response to an impact thereon, characterized in that said aft attachment means comprises:

a lateral rod rigidly supported on said vehicle body vertically above said structural housing, a retainer on said structural housing hooked over said lateral rod such that said aft end of said structural housing is vertically suspended from said lateral rod, a block having a ramp thereon, and means operative to mount said block on said structural housing for linear translation parallel to said longitudinal centerline of said structural housing away from said forward attachment to a position in which said ramp on said block is wedged between said structural housing and said lateral rod so that said lateral rod is captured between said ramp and said retainer and said aft end of said structural housing is restrained perpendicular to and in the direction of said longitudinal centerline of said structural housing.

2. The energy-absorbing motor vehicle steering column recited in claim 1 wherein said means operative to mount said block on said structural housing for linear translation parallel to said longitudinal centerline of said structural housing away from said forward attachment comprises:

a channel in said structural housing parallel to said longitudinal centerline thereof in which said block is slidably supported, and a spring in said channel operative to resiliently bias said block toward said lateral rod.

* * * * *